No. 889,970. PATENTED JUNE 9, 1908.
T. RUSTAD.
STUMP AND BRUSH CUTTING MACHINE.
APPLICATION FILED APR. 23, 1906.
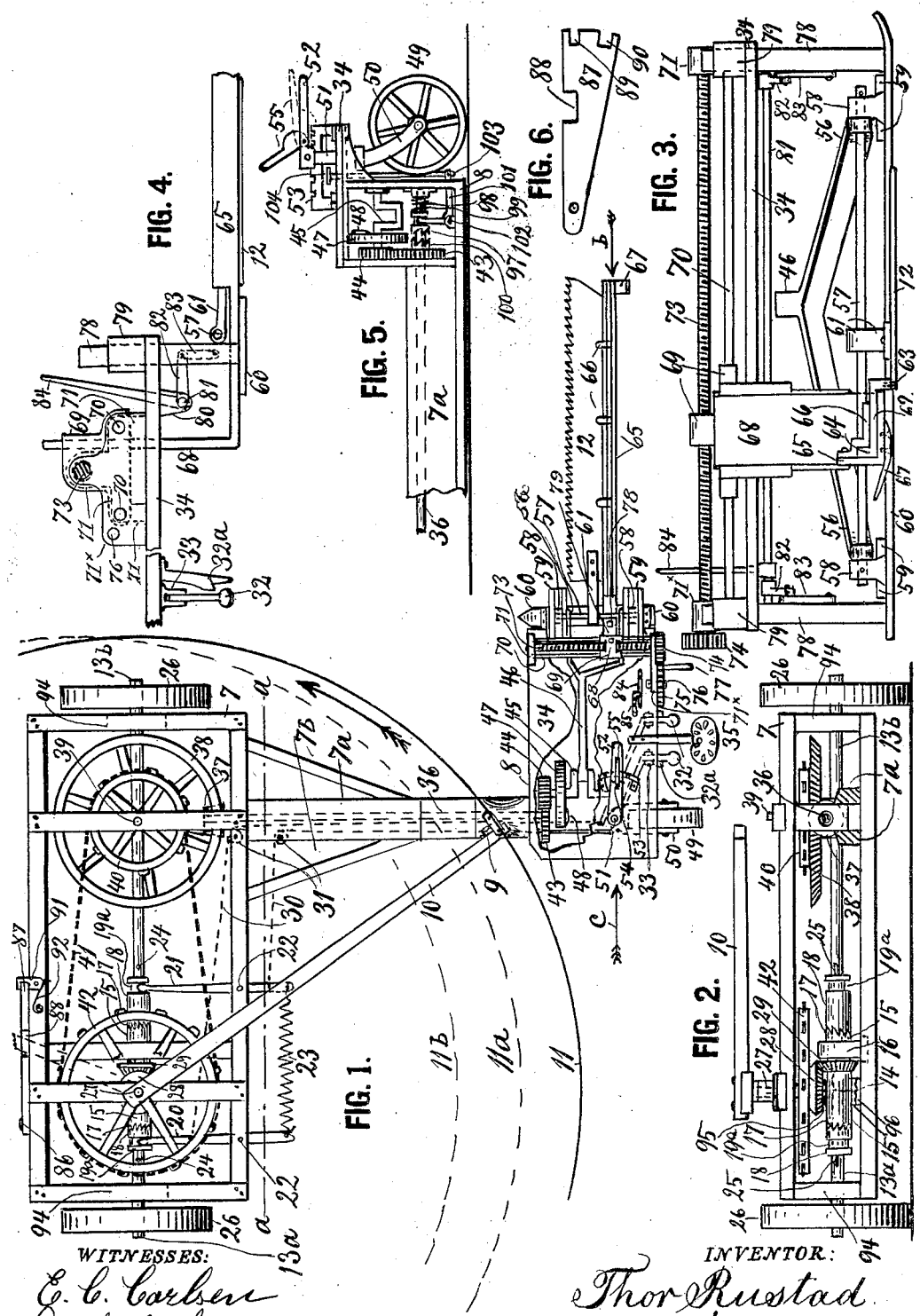
WITNESSES:
E. C. Carlsen
M. H. Carlsen.
INVENTOR:
Thor Rustad
BY his ATTORNEY:
A. M. Carlsen.

UNITED STATES PATENT OFFICE.

THOR RUSTAD, OF CISCO, MINNESOTA.

STUMP AND BRUSH CUTTING MACHINE.

No. 889,970.      Specification of Letters Patent.      Patented June 9, 1908.

Application filed April 23, 1906. Serial No. 313,166.

*To all whom it may concern:*

Be it known that I, THOR RUSTAD, a citizen of the United States, residing at Cisco, in the county of Polk and State of Minnesota, have invented certain new and useful Improvements in Stump and Brush Cutting Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to stump and brush cutting machines, and the object of the invention is to provide a device which can be used for the purpose of cleaning stumps, trees and brush from the ground; cutting the same low enough down so that the ground can be sown and a mowing machine used upon the land.

Ordinarily new land as it is turned is planted in corn or other crops until the stumps have rotted or have been burned or otherwise destroyed, as it is not practicable to put the said land into grain or other crop requiring reapers or mowers. But by cutting off the brush and timber, at the surface of the ground, a reaper or mower can be run over the land the same year.

The invention consists of the novel features of construction hereinafter fully described, pointed out in the claims, and shown in the accompanying drawings, in which,—

Figure 1 is a plan view of the machine. In said view 7 may be called the front frame and 8 the rear frame. Fig. 2 is a rear elevation on the line *a a* as in Fig. 1 with some parts omitted. Fig. 3 is an enlarged side elevation of the rear frame and some of the adjacent parts, looking in the direction of the arrow *b*. Fig. 4 is a rear elevation of a portion of the platform forming the top of the rear frame, and some of the adjacent parts shown, and the gears 74—76 removed. Fig. 5 is a side elevation of the rear frame looking in the direction of the arrow *c*, with some of the adjacent parts. Fig. 6 is a detail rear view of a latch by which the sweep may be locked in position to serve as a pole.

Referring to the drawing by reference numerals, it will be seen that the machine, although it may be operated by an engine of any suitable kind carried by the machine, is in the present drawings shown as adapted to be operated by one or more draft animals, say horses (not shown) hitched to the clevis 9 at the end of the sweep 10 and walking in a circle 11, about the front frame 7, thereby operating the saw 12 and moving the entire machine forward as fast as required, by means presently to be fully described.

The front frame 7 may be made in any suitable form and not necessarily as shown. In said frame are journaled in axial line two shafts $13^a$ and $13^b$ butting together at 14, (see Fig. 2) in a sleeve 15, journaled in the bearing 16 and having at each end clutch teeth 17 meshing with the teeth of a sliding clutch member 18 having an annular groove $19^a$ in which engage forks or levers 20 and 21 (see Fig. 1) pivoted at 22 to the frame and normally held by the contracting spring 23 with the clutch-members disengaged and resting against pins 24 in the shaft. Said clutch-members sliding on feather-keys 25, and the supporting wheels 26 being fixed on the shafts, it follows that when the sweep 10, shaft 27 and bevel gear 28 rotate the bevel gear 29, which is fixed on the sleeve 15, rotates the sleeve and thereby also either or both of the shafts $13^a$ and $13^b$ and the ground wheels according as the clutches 18 are applied. One clutch engaged with the sleeve will move that side of the machine forward, and both clutches applied will cause both of the supporting wheels to roll forward at the same speed.

The clutch-levers 20—21 are operated against the resistance of the spring 23 by chain 30 guided by sheaves 31, and foot levers 32 pivoted in brackets 33 below the platform 34, and operatively connected in any suitable manner to said chains. Said foot levers 32 are arranged within convenient reach from the driver's seat 35.

The rear frame 8 is fixed to the front frame 7 by a hollow downwardly open arm or middle frame, $7^a$, held firm by braces $7^b$ and being low enough for the horses to walk across it. Through said middle frame extends, properly journaled, the tumbler shaft 36, having on its forward end fixed a bevel pinion 37, driven by a large bevel gear 38, revolving on a stud 39 fixed in the front frame; on this large gear is fixed a small sprocket-wheel 40, driven by a chain-belt 41 and a larger sprocket-wheel 42 fixed on the shaft 27, which the sweep rotates.

On the rear end of the shaft 36 is journaled a comparatively large cogwheel 43, driving a smaller cog-wheel 44 fixed on a crank-shaft 45, which is journaled in the rear frame and operates the saw 12 by means of the pitman 46, as will presently be further described; on said crank-shaft is fixed a fly-wheel 47, provided with a weight 48 to counterbalance the weight and momentum of the crank, pitman and saw.

The rear frame is supported by a wheel 49 journaled in a curved fork 50, whose stem 51 is journaled in the frame and provided at its upper end with a horizontal hand-lever 52, swinging above a notched segment 53, and carrying in a slot 54 a pivoted dog or cam 55, which when raised up as in Fig. 5, sets the lever free to swing so that the caster may turn as the unequal motion of the front supporting wheels may require. The lever 51 may also be used to steer the machine while only one of the wheels 26 moves it forward. For a long turning movement or a straight forward movement the dog 55 is dropped into a suitable notch in the segment 53. In general, and especially when the saw is to cut through a tree or heavy stump, the dog is dropped into the segment with the caster wheel 49 in the position shown in Fig. 1, so as to resist the turning motion of the machine caused by the pushing of the saw.

As best shown in Figs. 1 and 3, the pitman 46 is bifurcated into two arms, 56, in which is journaled a rod 57 having its ends fixed in two blocks or heads 58, dovetailed to slide in guides 59 fixed upon a broad shoe 60, whose forward end is curved upward to act as a runner. On the pivot rod 57 slides the arm 61 to which the saw is secured either directly, or by means of the bar 62, which is almost of Z-shaped cross section and has the rear edge of the saw secured at 63 to its lower rib, while the upper rib 64 and the bar proper slide under keepers 66 on a supporting bar 65 of angular cross section. Said bar 65 has its outer end provided with a small runner or guard 67 to prevent catching in the ground; the inner end of the bar has its upper rib cut away (see Fig. 4) where the pivot rod 57 moves. In the latter view it will also be seen that the bar 65 rests upon the shoe 60 and has a vertical arm 68 sliding vertically in a head 69, which slides horizontally on guiding bars 70, whose ends are fixed in supports 71 and 71$^{\times}$ upon the platform. In said supports (see Figs. 1-3 and 4) are journaled the ends of a feed screw 73, which is threaded through the head 69 so as to move it and thereby feed the bar 65 and the saw forward through stumps and trees while the machine makes no forward movement.

As it takes but little force to feed the saw forward and it is desirable to return the saw quickly to its rearward position, ready for the next cut the screw has at one end a fixed pinion 74 driven by a larger gear wheel 75 revolving on a stud 76 and having a handle 77 serving as hand crank. The slow turning of this crank gives a gentle pressure to the saw, and a speedy turning of the crank in the reverse direction restores the saw very speedily to the desired position for a new cut.

The shoe 60 is provided with two vertical posts 78 sliding in suitable bearings 79 fixed upon the right hand corners of the platform, and in bearings or hangers 80 (shown in Fig. 4) are journaled the ends of a rock-shaft 81 having arms 82 connected by links 83 to the posts 78, and a lever 84 by which the shoe 60, bar 65 and saw 12 may be raised from the ground and retained at any desired elevation by engaging the lever with a suitable notched segment 85 (shown in Fig. 1). The main object of thus raising the saw is to make it pass over obstructions in moving the machine idle, but there may also be occasion for raising the saw over rocks, ant-hills, &c., while operating the machine.

Upon the front bar of the front frame is pivoted at 86 a latch 87 having in its upper edge a notch 88 (see Fig. 6) and in its vertically swinging end two notches 89 and 90. Adjacent to the latter notches is pivoted upon the frame a dog 91, normally held by the spring 92 in a forward position and thus to engage one of the notches 89 and 90. The dog is left in the notch 89 as long as the machine is in operation, but if the machine is to be hauled for some distance idle then the sweep 10 is held in the notch 88, the dog 91, being in the notch 90, holds the latch high enough to engage the sweep, which being held in that position serves as a pole.

In further explanation of the operation of the machine, it will be understood that a notched arm 32$^a$ (see Fig. 4) will hold down the pedal 32 as long as it is desired to have the corresponding clutch and supporting wheel, or wheels, 26 rotated. If the machine is cutting light brush the two wheels 26 may thus move slowly forward and feed the saw so it needs not to be fed by the screw 73; the horses in this case travel one turn on the circle 11, the next turn on circle 11$^a$, then on 11$^b$ &c., so that their tracks form a kind of spiral. But if a stump or tree is to be cut the wheels 26 are stopped by the pedals 32 and the saw is fed slowly forward by the screw 73, as already described.

In Fig. 5 is shown on the shaft 36 a clutch member 97, which slides on the shaft guided by a feather-key 98, and is normally held by the spring 99 engaged with the clutch member 100, which is provided on the wheel 43. The member 97 is moved against the spring by a bell-crank lever 101, fulcrumed at 102, and having a pivoted push-rod 103 with a foot plate 104 at its top end, so that the saw may be stopped in an instant by a pressure of the operator's foot upon said plate, and started by the spring acting on the clutch, as soon as the plate 104 is allowed to rise again.

In Figs. 3 and 4 is clearly shown that the saw blade is arranged to travel closer to the ground than the guiding bar 62, whereby the latter will pass freely over the stumps left after the saw.

In Figs. 1 and 2 is indicated that the main frame may have vertical posts 94 in which to journal the shafts $13^a$—$13^b$. It may also have a horizontal bar 95 (see Fig. 2) secured on posts 96 and forming a bearing for the lower end of shaft 27; but it should be understood that I do not mean or wish to limit the construction of this or any of the frame work to the exact form shown. The same must be said of the saw-guiding and operating bars; thus I have shown a very broad saw blade while it is obvious that a very narrow blade may answer as well if mounted in and operated by a suitable frame to keep it straight, say similar to common buck-saws or gang-saws. Also the vertical sliding of the posts 68 and 78 may be changed into joints for raising the saw up endwise without diverging from the scope and spirit of my invention.

Having thus described my invention, what I claim as new, and desire to secure by Letters Patent, is:—

1. A device of the kind described, comprising a wheeled frame adapted to travel, a rotary sweep carried by the frame and a horizontally cutting saw operatively connected with the sweep, and operative connection between the sweep and the supporting wheels.

2. A device of the kind described, comprising a frame with supporting traction wheels, a rotary sweep carried by the frame, a saw operatively connected with the sweep, and a clutch-mechanism for connecting the sweep with one or more of the traction wheels, so as to move one or both sides of the machine forward when desired, and thereby feed the saw forward.

3. A device of the kind described, comprising a frame with supporting wheels, a rotary sweep carried by the frame, a saw operatively connected with the sweep, a clutch-mechanism for connecting the sweep with one or more of the supporting wheels so as to move one or both sides of the machine forward when desired, and a hand-operated mechanism for feeding the saw forward when forward motion of the machine is either too slow or stopped.

4. A machine of the kind described, made up of a front main frame, a smaller rear frame and a frame arm connecting said frames and being low enough for horses to walk across it, a rotary sweep carried by the front frame, a reciprocating horizontally guided saw extending laterally from the rear frame, speed-increasing means connecting said saw with the sweep and traction wheels supporting the machine, and operated by the sweep, whereby the saw is both operated and fed forward by the turning of the sweep.

5. A machine of the kind described, having supporting wheels and a frame carried thereby, a saw at one side of the frame, a rotary sweep carried by the frame and means connecting the saw and the supporting wheels with the sweep, so that the horse operating the sweep travels in advancing spirals.

6. A machine of the kind described, having supporting wheels and a frame carried thereby, a saw at one side of the frame, a rotary sweep carried by the frame, and means connecting the saw and the supporting wheels with the sweep, so that the horse operating the sweep travels in advancing spirals, said supporting wheels carrying mainly the front part of the frame, a caster wheel supporting and steering the rear end of the frame, and means for holding the stem of said caster wheel in various positions and for leaving it free to turn as the motion of the frame may require.

7. A machine of the kind described, comprising a frame, wheels supporting the frame a cutting member carried at one side of the frame, a main shaft journaled in the frame and adapted to be rotated by a source of power, a speed-increasing mechanism connecting said shaft with the cutting member, and means for connecting said shaft with either one or both of the supporting wheels, for the purpose set forth.

8. In a machine of the class described, the combination with a wheeled frame adapted to travel, of a saw-guiding bar extending horizontally and transversely out from one side of the frame, a reciprocating saw blade guided by said bar and arranged to cut lower than the bar, and means for moving the machine and operating the saw during said motion, substantially as set forth.

9. A machine of the kind described, comprising, supporting wheels, a frame carried thereby, a main shaft journaled in the frame and adapted to be rotated by suitable power, a saw projecting beyond one side of the frame, clutch mechanism for connecting the main shaft with the supporting wheels, clutch mechanism for connecting the main shaft with the saw; a driver's seat on the frame, and means for operating said clutches from said seat.

In testimony whereof I affix my signature, in presence of two witnesses.

THOR RUSTAD.

Witnesses:
  E. O. MELSNESS,
  C. O. MELSNESS.